(12) United States Patent  (10) Patent No.: US 9,306,382 B2
Ladié et al.  (45) Date of Patent: Apr. 5, 2016

(54) JOINTS FOR HIGH VOLTAGE CABLES INSULATED WITH IMPREGNATED PAPER OR PAPER-POLYPROPYLENE LAMINATE (PPL)

(75) Inventors: Pierluigi Ladié, Milan (IT); Mario Ravasio, Milan (IT)

(73) Assignee: PRYSMIAN S.P.A., Milan (IT)

( * ) Notice: Subject to any disclaimer, the term of this patent is extended or adjusted under 35 U.S.C. 154(b) by 170 days.

(21) Appl. No.: 14/001,789

(22) PCT Filed: Mar. 1, 2011

(86) PCT No.: PCT/EP2011/000982
§ 371 (c)(1),
(2), (4) Date: Nov. 25, 2013

(87) PCT Pub. No.: WO2012/116712
PCT Pub. Date: Sep. 7, 2012

(65) Prior Publication Data
US 2014/0124263 A1    May 8, 2014

(51) Int. Cl.
*H02G 15/184* (2006.01)
*H02G 15/24* (2006.01)
*H02G 1/14* (2006.01)

(52) U.S. Cl.
CPC ............... *H02G 15/184* (2013.01); *H02G 1/14* (2013.01); *H02G 15/24* (2013.01); *Y10T 29/49195* (2015.01)

(58) Field of Classification Search
CPC .............................. H02G 15/184; H02G 1/14
USPC .......................................... 174/88 R; 29/869
See application file for complete search history.

(56) References Cited

U.S. PATENT DOCUMENTS 1,979,150 A * 10/1934 Emanueli ...................... 174/15.6
3,017,306 A * 1/1962 Priaroggia ...................... 156/48
(Continued)

FOREIGN PATENT DOCUMENTS

CN    1060931 A    5/1992
CN    101606297 A    12/2009
(Continued)

OTHER PUBLICATIONS

Feb. 25, 2015, Russian Decision on Grant issued in corresponding Russian Application No. 2013143964/07(067706), with English-language translation.

(Continued)

*Primary Examiner* — Timothy Thompson
*Assistant Examiner* — Charles Pizzuto
(74) *Attorney, Agent, or Firm* — Harness, Dickey & Pierce, PLC

(57) ABSTRACT

A method of jointing two high voltage impregnated cables may include exposing an impregnated cable insulation layer of cable ends by removing at least one protecting layer and an outer semiconducting layer; exposing a terminal length of conductors of the cable ends by cutting a portion of the impregnated cable insulation layer and by removing an inner semiconducting layer; mechanically and electrically connecting the conductors; filling at least in part a space left by the removed impregnated cable insulation layer with a conductive insert; providing an intermediate semiconducting layer to surround the conductive insert and abutting on portions of cable insulation layers adjacent to the conductive insert; applying a stratified insulation, impregnated with a second viscous compound, overlapping the exposed impregnated cable insulation layer of the cable ends and covering the intermediate semiconducting layer; electrically screening the conductors; and tightly containing the first and/or second viscous compounds.

20 Claims, 5 Drawing Sheets

(56) References Cited

U.S. PATENT DOCUMENTS

| | | | | |
|---|---|---|---|---|
| 4,051,298 A | * | 9/1977 | Misiura et al. | 428/383 |
| 4,133,970 A | * | 1/1979 | Lusk | 174/19 |
| 4,822,952 A | * | 4/1989 | Katz et al. | 174/73.1 |
| 5,187,009 A | * | 2/1993 | Kimura et al. | 428/383 |
| 5,606,149 A | * | 2/1997 | Yaworski et al. | 174/92 |
| 8,097,807 B2 | | 1/2012 | Aue et al. | |
| 2001/0042635 A1 | * | 11/2001 | Kondo et al. | 174/110 R |
| 2010/0132976 A1 | * | 6/2010 | Tognali et al. | 174/113 R |

FOREIGN PATENT DOCUMENTS

| | | | |
|---|---|---|---|
| CN | 101902024 A H | * | 12/2010 |
| DE | 912593 C | | 5/1954 |
| GB | 916946 A | | 1/1963 |
| RU | 2190913 C1 | | 10/2002 |
| RU | 2388126 C1 | | 4/2010 |
| WO | WO-2008/087151 A1 | | 7/2008 |
| WO | WO 2010149229 A1 H | * | 12/2010 ... H01B 9/02 |
| WO | WO 2010149229 A1 I | * | 12/2010 ... H01B 9/02 |

OTHER PUBLICATIONS

International Search Report PCT/ISA/210 for PCT/EP2011/000982 dated Dec. 8, 2011.

Dec. 2, 2015, Chinese Office Action issued in corresponding Chinese Application No. 201180068775.7 with English-language translation.

* cited by examiner

JOINTS FOR HIGH VOLTAGE CABLES INSULATED WITH IMPREGNATED PAPER OR PAPER-POLYPROPYLENE LAMINATE (PPL)

CROSS-REFERENCE TO RELATED APPLICATIONS

This application is a national stage entry from international Application No. PCT/EP2011/000982, filed on Mar. 1, 2011, in the Receiving Office of the European Patent Office, the entire contents of which are incorporated herein by reference.

The present invention relates to a joint for high voltage (HV) impregnated cables, as well as a power supply line comprising at least one of such joints, and a method of jointing HV impregnated cables.

More specifically, the invention relates to joints for HV cables for direct current (DC) and alternate current (AC) transport, preferably for terrestrial (possibly underground) applications.

In the present description and claims:
- with "high voltage" or HV it is meant to indicate voltages higher than 35 kV, thus encompassing a range sometimes indicated as "extra high voltage" (EHV) used for cables capable of transporting voltages higher than 200 kV;
- with "impregnated cable" it is meant to indicate a cable insulated with paper or paper-polypropylene laminate (PPL) which is impregnated with a viscous compound, especially designed for high voltage transmission, terrestrial as well as submarine; the viscosity of the impregnating compound is typically of about 900-1500 cSt at 60° C. for DC application and of 4-180 cSt at 40° C. for AC application;
- with "joint" it is meant to indicate an assembly adapted to mechanically and electrically connect two electrical cables;
- with "conductive core" it is meant to indicate an electric conductor surrounded by an inner semiconducting layer in direct contact thereto;
- the terms "radial" and "longitudinal" are used to indicate a direction, respectively, perpendicular and parallel to a reference longitudinal axis of the cable ends and jointing assembly; the expressions "radially inner" and "radially outer" are used to indicate a position along a radial direction with respect to the abovementioned longitudinal axis, while the expressions "longitudinally inner" and "longitudinally outer" are used to indicate a position along a direction parallel to the aforementioned longitudinal axis and with respect to a reference plane perpendicular to said longitudinal axis and intersecting the joint in a central portion thereof;
- a size along the axial direction is termed "length", while a size along the radial direction is termed "thickness";
- "tapering degree" is used to indicate the ratio maximum thickness to length of a portion having a radial size variation;
- the terms "conductive", "insulated", "connected" and other terms that might have a thermal or mechanical meaning are used in the electrical meaning, unless otherwise specified.

For the purpose of the present description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

High voltage electric power networks or transmission systems are used e.g. to transmit electric power from a power generating plant to a user, such as a city, a factory or other entity. Such networks may comprise impregnated cables.

Impregnated cables are usually used for carrying high voltage direct current (HVDC). HVDC cables are mainly used for submarine applications because of the long span lengths involved, which render the use of AC cables impractical due to the high losses for capacitive current. Terrestrial applications of HVDC cables are often limited to the land portions of submarine connections due to high transportation and laying costs.

In terrestrial spans of impregnated cables, due to the large weight per unit length of such cables (of about 30 kg/m to about 60 kg/m), each cable portion may be about one kilometer long only, which means that a joint is required correspondingly often.

Jointing portions of impregnated cables according to the state of the art is a time-consuming and expensive operation because it involves the reconstruction of all of the cable layers, and in particular of the insulation layer.

For example, U.S. Pat. No. 3,017,306 discloses the construction of the insulation in joints for high tension electric cables that are insulated with impregnated paper. The bared conductors are mechanically and electrically connected by means of a ferrule; then, after having removed the desired length of metallic sheath from the cable ends to be jointed, a portion of the insulation is removed from the cable conductors so as to leave a penciled-down or step-profile of insulation on the conductors, and then, the insulation is reconstructed by means of paper tapes or tubes, generally to a diameter greater than that of the original cable insulation. More specifically, there is wound, on the outer helical layer of paper of each cable core to be joined, an auxiliary tube of paper, which paper may be impregnated with oil insulation or other suitable insulation and of small thickness. The space between the auxiliary tubes is then filled either with an auxiliary paper tube or with a series of paper tapes or tubes up to the external diameter of said auxiliary paper tubes, so as to obtain a uniform cylindrical surface. On this surface a single preformed outer paper tube is assembled. Thereafter, the excess portions of the paper tubes are removed. A continuous electric screening may be applied on the outside of the outer paper tube by winding thereon a wire or metal woven tape in close coil formation, which winding is then connected to the metal sheath of the cable.

A low tapering degree is imparted to the cable insulation during its removal mainly because of the necessity of creating, after the insulation reconstruction, pathways long enough so as to prevent the propagation of possible discharges. The insulation is typically removed manually.

Due to the diameter of the insulation and the low tapering degree, a large amount of insulation is to be first removed and then reconstructed. Each joint usually requires about a working week to be completed. The joint itself can have a length of up to 8 meters that implies sheltering and cost problems.

The reconstruction of the insulation also takes place manually, by tightly winding bobbins of a stretch paper strip.

The overall jointing operation is to be carried out in a controlled environment, e.g. at a controlled humidity, at least up to the protection of the insulating layer. A but or similar shelter has to be raised about the joint.

There is therefore the need of shortening the jointing operation of HV impregnated cables, both in terms of time and space—and, accordingly, of cost—, while preserving the accuracy and efficiency thereof.

The Applicant faced the technical problem of providing a jointing technique which is accurate and cost-effective.

The Applicant understood that an acceptable electric field can be attained in an impregnated paper insulation joint even without removing the cable insulation according to a profile with a low tapering degree.

In particular, the Applicant found that the above problem can be solved by the following provisions:

removing the impregnated insulating layer of each cable end to be joined by cutting the entire thickness of the layer substantially perpendicularly to the longitudinal cable axis;

connecting the conductors of the two cables;

filling the space between the ends of the insulating layers with a conductive element;

covering the conductive element with a semiconducting layer extending over the ends of the insulating layers; and applying a stratified impregnated insulation over said semiconducting layer.

In this way the constraint of having a "pencil-like" interface between the original and the applied insulating layers to lengthen the pathway and to avoid possible discharges is relieved. Also, the resulting electric gradient is uniform in the cable joint. Moreover time and space for the cable jointing are considerably reduced.

The Applicant found that the provision of a stratified impregnated insulation overlapping the original impregnated insulation can have a further beneficial effect i.e. that of avoiding the reconstruction of other cable layers removed for baring the insulation and the conductor, typically metal layer/s and polymeric jacket/s, hereinafter referred to as "protecting layers".

The Applicant found that, in a cable joint wherein a stratified insulation overlapping the original insulating layer is applied, the removed protecting layers can be functionally replaced by positioning of a metal casing containing an impregnating viscous compound, which casing advantageously includes a volume compensating device, preferably enclosed within the casing. The metal casing provides protection to the cable joint and retains the viscous compound impregnating the insulating layers.

Accordingly, in an aspect the present invention relates to a method of jointing two high voltage impregnated cables, each comprising a conductive core, made of a conductor wrapped in an inner semiconducting layer, a cable insulation layer, impregnated with a viscous compound, radially external to the conductive core, an outer semiconducting layer radially external to the cable insulation layer and at least one protecting layer radially external to the outer semiconducting layer, the method comprising the steps of:

exposing a length of said impregnated cable insulation layer of each cable end by removing the at least one protecting layer and the outer semiconducting layer, exposing a terminal length of the conductor of each cable end by cutting essentially perpendicularly to the longitudinal axis of each cable a portion of said impregnated cable insulation layer and by removing the inner semiconducting layer, mechanically and electrically connecting said conductors, filling at least in part the space left by the removed impregnated cable insulation layer with a conductive insert, providing an intermediate semiconducting layer to surround the conductive insert and abutting on portions of cable insulation layers adjacent to the conductive insert, applying a stratified insulation, impregnated with a viscous compound, longitudinally overlapping the exposed length of impregnated cable insulation layer of each cable end and covering the intermediate semiconducting layer, electrically screening the conductors, and tightly containing the viscous compound.

The viscous compound impregnating the cable insulating layer can be the same as or different from the viscous compound impregnating the stratified insulation, but the two viscous compounds have, preferably, substantially the same viscosity.

In the present description and in the attached claims, by "cutting essentially perpendicularly to the longitudinal axis" it is meant that a cut is made with cut face flat or slightly tapered to form, at each radial position, an angle preferably not greater than 2° with a plane perpendicular to the longitudinal axis.

Preferably in said step of exposing a terminal length of the conductor of each cable end, the cutting for removal of said impregnated cable insulation layer is effected at a distance from the end of the cable suitable for the electrical and mechanical connection of the conductors to be joined.

Advantageously the step of mechanically and electrically connecting the conductors of the cables to be joined is carried out increasing the outer diameter of the conductive connection with respect to the outer diameter of said conductors. This simplifies the connection procedure, avoiding the collapsing operation of the welded zone and/or of a connecting ferrule which would be required to have an outer diameter substantially equal to that of the connected conductors.

The step of filling at least in part the space left by the removed impregnated cable insulation layer with a conductive insert preferably comprises arranging a metal insert having substantially the same outer diameter as the outer diameter of the impregnated cable insulation layer.

The step of applying a stratified insulation preferably comprises the step of providing rolls of impregnated insulation at both sides of the intermediate semiconducting layer, said first rolls having substantially the same outer diameter as said intermediate semiconducting layer so to form an even cylindrical surface.

The step of applying a stratified insulation advantageously comprises the step of arranging at least one further layer of impregnated insulation material over the first rolls of impregnated insulation and the intermediate semiconducting layer.

Preferably the method further comprises the step of shaving the stratified impregnated insulation at the longitudinal edges to obtain an even surface with a sigmoid profile.

The step of electrically screening the joint is advantageously carried out by wrapping the stratified insulation—and the underlying layers and portions, as a consequence—with a layer of semiconductive material (hereinafter referred to as "external semiconducting layer") substantially analogous to the outer semiconducting layer of each cable to be joined.

Advantageously, the method of the invention further comprises a step of providing a volume compensating device.

In another aspect, the invention relates to a joint for splicing two HV impregnated cables comprising respective conductive cores made of conductors wrapped in inner semiconducting layers, cable insulation layers, impregnated by a viscous compound, radially external to the conductive cores, outer semiconducting layers surrounding the cable insulation layers, and protecting layers radially external to the outer semiconducting layers, the joint having a longitudinal axis and comprising:

mechanically and electrically connected conductors;
impregnated cable insulation layers having faces cut essentially perpendicular to the longitudinal axis of the joint and being shorter than the respective conductors;
a conductive insert interposed between the faces of the impregnated cable insulation layers;
an intermediate semiconducting layer surrounding the conductive insert and abutting on portions of cable insulation layers adjacent to the conductive insert;
a stratified insulation, impregnated with a viscous compound, longitudinally overlapping the impregnated cable insulation layers and covering the intermediate semiconducting layer;
an external semiconducting layer wrapping the impregnated stratified insulation and the impregnated cable insulation layers;
a metal casing enclosing the external semiconducting layer and extending over the outer semiconducting layers; and
a viscous compound contained in said metal casing.

Preferably, the joint splices two high voltage direct current cables.

Preferably, the conductive insert comprises a metal insert. Said metal insert is advantageously made in two semi-cylindrical hollow halves.

The metal insert is preferably made of aluminum, copper or a composite thereof.

Advantageously the intermediate semiconducting layer has edges with a tapering degree of at most 1:10, preferably of at most 1:15. The maximum tapering degree suitable for the intermediate semiconducting layer depends on many factors such as the length of the joint, the kind of semiconducting material used for making such layer, the electric field generated in the spliced cables.

Preferably the intermediate semiconducting layer is made by a roll of carbon paper.

The intermediate semiconducting layer overlaps portions of cable insulating layers to an extent suitable to cover the interface between such layers and the conductive insert. Such extent can vary from few, for example, 5 mm to 80 mm or more.

The impregnated stratified insulation can comprise at least one roll of wrapped sheet of impregnated insulation material, preferably at least two, more preferably at least three.

Advantageously, said at least one roll has edges with a tapering degree of at most 1:10, preferably of at most 1:15, as said in connection with the intermediate semiconducting layer construction.

The tapering degree of the rolls of the stratified insulation preferably increases while increasing the radial distance of the rolls from the longitudinal axis of the joint.

Advantageously, the edges of at least one roll of one layer of the impregnated stratified insulation are longitudinally offset with respect to the edges of at least one roll of a radially adjacent layer. This increases the electrical strength of the stratified impregnated insulation.

Preferably, the innermost layer of the impregnated stratified insulation comprises two rolls of impregnated insulation material positioned at both sides of the intermediate semiconducting layer and having substantially the same outer diameter thereof.

Advantageously, windings of stretch paper are interposed in the spaces between edges of longitudinally adjacent rolls.

Preferably, the joint of the invention comprises a volume compensating device operatively connected to the metal casing.

Advantageously, the volume compensating device is positioned within said metal casing.

Preferably, the metal casing is composed by two halves joined, preferably, substantially at the middle longitudinal plane of the joint.

In another further aspect, the invention relates to a power supply line comprising at least one joint as disclosed above.

The features and advantages of the present invention will be made apparent by the following detailed description of some exemplary embodiments thereof, such a description being provided merely by way of non-limiting examples, and being made with reference to the attached drawings, wherein.

Figure 1:
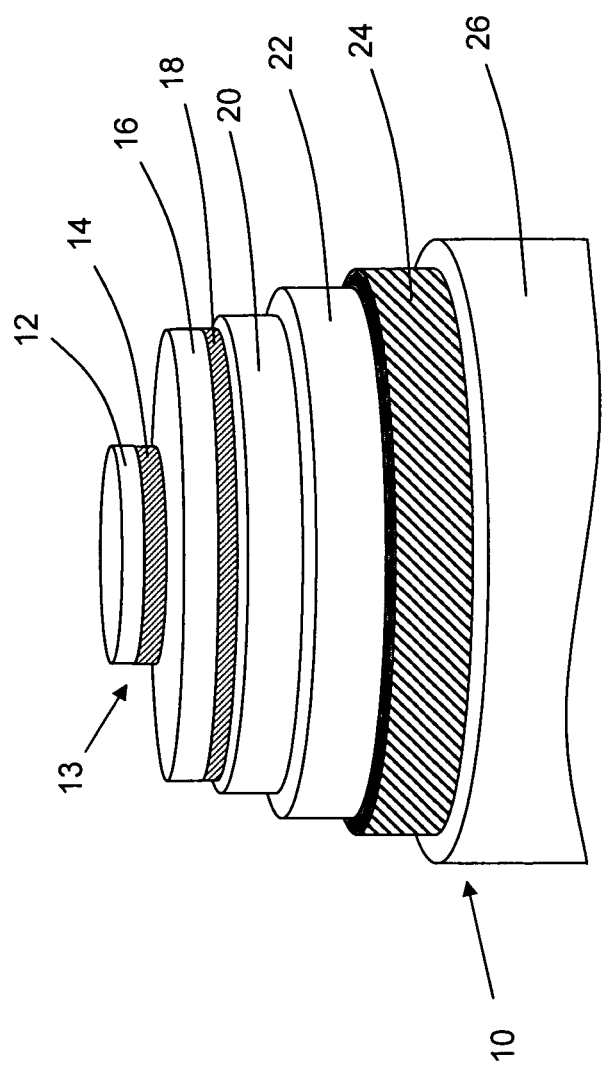
FIG. 1 shows the structure of an embodiment of a HVDC impregnated cable.

FIG. 1 shows the structure of a typical mass-impregnated HVDC cable 10. Cable 10 is formed of a conductor 12 sized for current transport, and made, for example, of copper or aluminum. Conductor 12 is surrounded by an inner semiconducting layer 14 made, for example, of carbon paper tapes. Conductor 12 and inner semiconducting layer 14 form together the cable conductive core 13. A cable insulation layer 16, made of paper or paper/polypropylene laminate (PPL) wound tapes impregnated with a viscous compound, is provided about the inner semiconducting layer 14. The viscosity of the impregnating compound is, for this kind of cable, typically of about 900-1500 cSt at 60° C. (for example, T2015 Impregnating Compound marketed by H&R ChemPharm Ltd., UK). An outer semiconducting layer 18, made, for example, of carbon paper tape, surrounds the cable insulation layer 16 and is surrounded, in turn, by a lead or lead alloy sheath 20. Sheath 20 is a continuous tube having the function of confining the impregnating viscous compound; it also has the function of electrostatically screening the conductor 12. Inner polymeric jacket 22, metallic tape reinforcement 24, and outer polymeric jacket 26 are provided for mechanical protection. Inner and outer polymeric jacket 22, 26 can be made of polyethylene.

Cable layers 20, 22, 24, 26 can be collectively referred to as "protecting layers".

With reference to FIGS. 2-5, a method according to the present invention for jointing two impregnated cables 10 and the resulting joint is shown.

A jointing zone of each cable end 10a, 10b is prepared by stripping off the layers 14-26 so as to leave an exposed portion of a suitable length of each layer, as will be understood from the further description hereinbelow.

In particular and contrarily to the known technique, the cable insulation layer 16 is cut essentially perpendicular to the longitudinal axis X of the cable ends 10a, 10b and stripped off for a predetermined length. The cut face 16a of the cable insulation layer 16 (FIG. 4) may be flat, preferably, or slightly tapered, and will form, at the radially outer position, an angle preferably not greater than 2° with a plane perpendicular to the longitudinal axis X (an angle of about 88° to 92° with the longitudinal axis X).

The cut can be made with a cutting edge at a distance from the surfaces 10c, 10d of the cable ends 10a, 10b so as to allow the electrical and mechanical connection of the conductors 12a, 12b. The length of removed cable insulation layer 16 should be as short as possible both to easily take the insulation layer off and, more importantly, to expedite the subsequent jointing steps. The length of removed cable insulation layer 16, for each cable end, can be 10% greater than the length suitable for performing the connection of the conductors 12a, 12b. The tapered, pencil-like removal of insulation layer is avoided.

Before or after having so prepared the jointing zone of each cable end 10a, 10b, a metal casing 100 (FIG. 2), formed of two halves, is temporarily slid around both cable ends 10a, 10b, away from the jointing zone.

Figure 4:
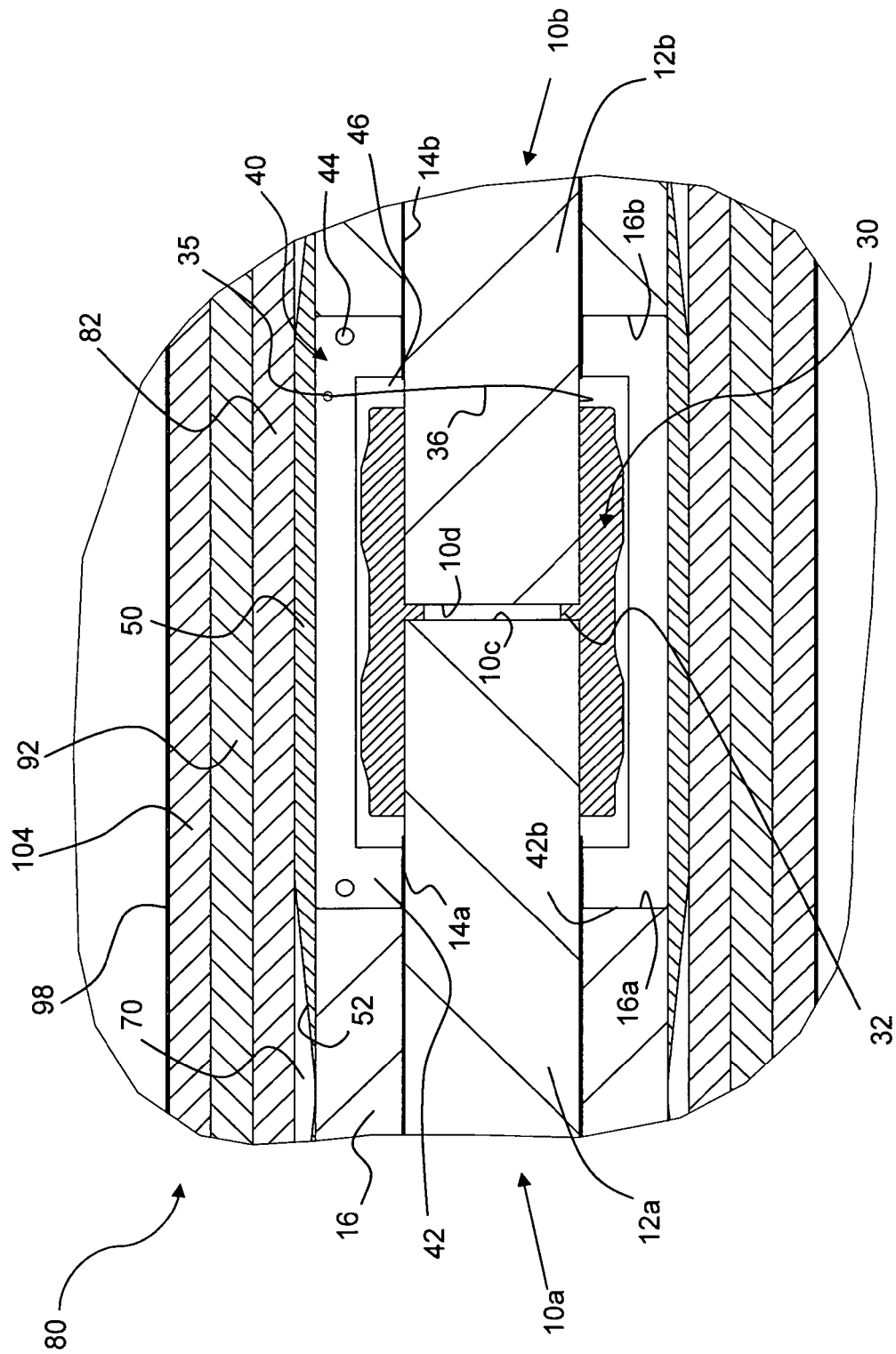
FIGS. 4 and 5 are magnified views of details of FIG. 2.

Thereafter, conductors 12a, 12b are electrically and mechanically connected at their exposed lengths. Reference is made to FIG. 4. When the conductors 12a, 12b are made of copper, the connection is preferably accomplished through a conductive connector or ferrule 30. Ferrule 30 is a tubular body having, at a longitudinally intermediate position, an internally protruding annular flange 32 so as to form two seats, each for receiving a respective one of the ends of the exposed conductors 12a, 12b abutting onto the flange 32.

Notably, the connection of the conductors 12a, 12b through the ferrule 30 takes place dispensing with a step of collapsing the ferrule, which would be required to make it have an outer diameter substantially equal to those of the conductors 12a, 12b.

Conductors 12a, 12b can also be welded to each other, e.g. through an arc welding process, without any ferrule, and again without the need of a subsequent collapsing step.

Once connected the conductors 12a, 12b, a metal insert 40 is inserted between the opposed cut faces 16a, 16b of insulation 16. Metal insert 40 can be composed of two semitubular halves each having, at the longitudinal ends, internally protruding annular flanges 42. The two halves are suitably joined together, for example with a pin-and-hole connection at 44.

Metal insert 40 may be arranged around the ferrule 30 to encase it, leaving an air gap 46 all around ferrule 30. Gap 46 may also be filled with an insulator, e.g. the viscous compound used for impregnating the insulation layer 16. An example of viscous compound suitable for the present invention is T2015 Impregnating Compound (H&R ChemPharm Ltd., UK).

Metal insert 40 abuts with its flanges 42 onto the inner semiconducting layer 14a, 14b, which extends into the gap 46. The exposed conductors 12a, 12b also extend into the air gap 46.

Metal insert 40 is suitably electrically connected with the conductors 12a, 12b by a metal link 36, e.g. a metal thread inserted in a hole 35 and optionally wound around one of the conductors 12a, 12b.

The outer diameter of metal insert 40 is substantially the same as the outer diameter of insulation layers 16 of the cable ends 10a, 10b.

The longitudinally outer face 42b of each flange 42 may be in contact with the cut face 16a of the cable insulation layer 16 or may leave a small air gap in between. The longitudinally outer face 42b of each flange 42 may be perpendicular to the longitudinal axis X of symmetry of metal insert 40, or may be depart from being perpendicular in much the same manner as disclosed above in connection with the cut of the insulation layer 16.

The jointing zone of cable ends 10a, 10b is prepared so that the cable insulation layer 16 is removed for a length essentially equal to half the length of the metal insert 40, and the exposed portion of conductor 12 of each cable end 10a 10b has a length slightly longer (for example 10% longer) than half the length of ferrule 30 but shorter than half the inner length of metal insert 40.

Metal insert 40 can be made of the same conductive material as conductors 12a, 12b, e.g. copper or aluminum. In view of the above disclosed geometry and feature (metal link 36), metal insert 40 is at the same electric voltage as conductor 12 and inner semiconducting layer 14.

A layer 50 of semiconducting paper is then formed around the metal insert 40 and the nearby terminal portion of exposed cable insulation layer 16. This intermediate semiconducting layer 50 is formed, for example, by winding several turns of a sheet of carbon paper having the shape of an isosceles trapezium, wherein the slant of the edges of the sheet is so selected, with respect to the outer diameter of the cable insulation layer 16 and of the metal insert 40, that the adjacent turns of semiconducting paper will be increasingly shorter as the diameter of the layer 50 increases. Thus, at its longitudinal ends, intermediate semiconducting layer 50 results to be tapered as shown at 52, with a "tapering degree" of for example, 1:15 thickness to length ratio.

The function of intermediate semiconducting layer 50 is electrically shielding the electric field gradient. The low tapering degree of its edges 52 aids to provide an electric field gradient sustainable by the thickness of a stratified impregnated insulation discussed below with reference to FIG. 3.

The intermediate semiconducting layer 50 overlaps a portion of 50 mm of each cable insulation layer 16.

Longitudinally on each side of the intermediate semiconducting layer 50, two rolls 60 of impregnated insulating paper are similarly formed from sheets having the shape of a right-angled trapezium, wherein the side adjacent to the intermediate semiconducting layer 50 is the tapered one. The slant of the tapered side is such that the longitudinal end 62 of impregnated insulating roll 60 has also a tapering degree of, e.g., 1:15. The other longitudinal end 64 of impregnated insulating roll 60, formed from the right angle side of the trapezium, is essentially perpendicular to longitudinal axis X.

Insulating rolls 60 have the same thickness as the intermediate semiconducting layer 50. Insulating paper rolls 60 are each formed at a short distance from intermediate semiconducting layer 50 onto the exposed surface of the cable insulation layer 16, the distance increasing as the diameter increases due to the tapered shape of rolls 50 and 60. Each space between intermediate semiconducting layer 50 and one insulating paper roll 60 is filled by tightly wrapping an impregnated stretch paper tape 70 for several turns longitudinally offset back and forth, until the outer diameter of rolls 50 and 60 is reached, having thus formed an essentially cylindrical surface with an essentially uniform outer diameter.

A plurality of superposed insulating layers 80 is then constructed about the cylindrical surface formed by intermediate semiconducting layer 50, insulating paper rolls 60 and stretch paper wrappings 70.

Figure 3:
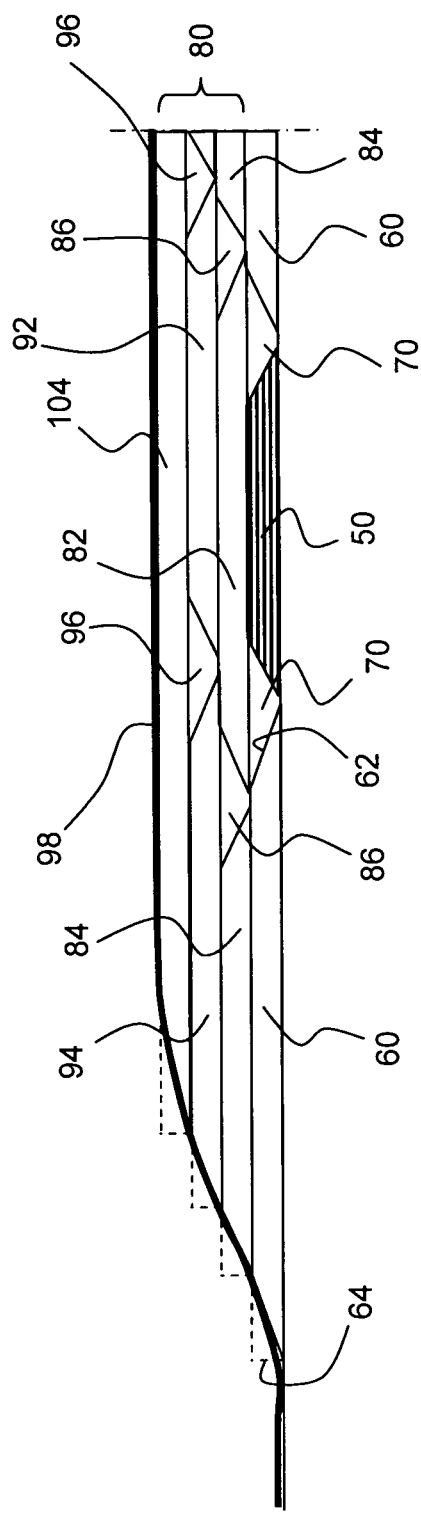
FIG. 3 shows a particular of the impregnated stratified insulation of the invention.

Reference is made to FIG. 3. To form such plurality of superposed insulating layers 80, sheets of impregnated insulating paper are used forming more than one layer of rolls of paper, each layer comprising one or more rolls. The edges of rolls of one layer—for example rolls 84, 82—are longitudinally offset with respect to the edges of rolls of a radially adjacent layer—for example rolls 94, 92. Similarly to intermediate semiconducting layer 50 and insulating rolls 60, each roll 84, 82, 94, 92, 104 is preferably formed from a sheet having the shape of an isosceles trapezium (rolls 82, 92, 102) or of a right-angled trapezium (rolls 84, 94, 104), and the spaces between rolls of a same layer are filled with stretch paper 86, 96 similarly to wrappings 70.

The tapered longitudinal edge(s) of each roll 82, 84, 94, 92, 104 can have a tapering degree of at most 1:10, for minimizing the risk of short circuits. Such tapering degree can increase while increasing the distance of the roll from the longitudinal axis of the cable. If, for example, the tapering degree of the intermediate semiconducting layer 50 and of the insulating rolls 60 is of 1:15, the tapering degree of rolls 84 and 82 can be of 1:13, and that of rolls 92,94 can be of 1:12 and so on.

In the embodiment shown, a layer of the stratified insulation comprises a central roll 82 formed from an isosceles trapezium, longitudinally centred with respect to the underlying intermediate semiconducting layer 50, and two lateral rolls 84, each formed from a right-angled trapezium. The spaces between roll 82 and each roll 84 are filled with stretch paper 86, and are preferably offset with respect to stretch paper 70 of the "underlying" layer. This offset construction aids in electrically containing the electric field gradient.

Another layer laid radially outside of the above-mentioned one comprises a central roll 92 formed from an isosceles trapezium, and two lateral rolls 94, each formed from a right-angled trapezium. The spaces between roll 92 and each roll 94 are filled with stretch paper 96, and are offset with respect to stretch paper 86 of the underlying layer.

Another further layer laid radially outside of just mentioned layer comprises a single roll 104 formed from an isosceles or right-angled trapezium.

The stratified insulation is composed by the plurality of superposed insulating layers 80 plus the insulating rolls 60 and the impregnated stretch paper tape 70.

It will be immediately recognised that, besides having avoided the pencil-like removal of the original cable insulation layer 16, also the application of the stratified insulation is very fast compared with the prior art, in that it involves the formation of rolls from wide sheets of impregnated paper, and the use of narrow strips of impregnated stretch paper only in the small gaps between adjacent roll edges.

Figure 2:
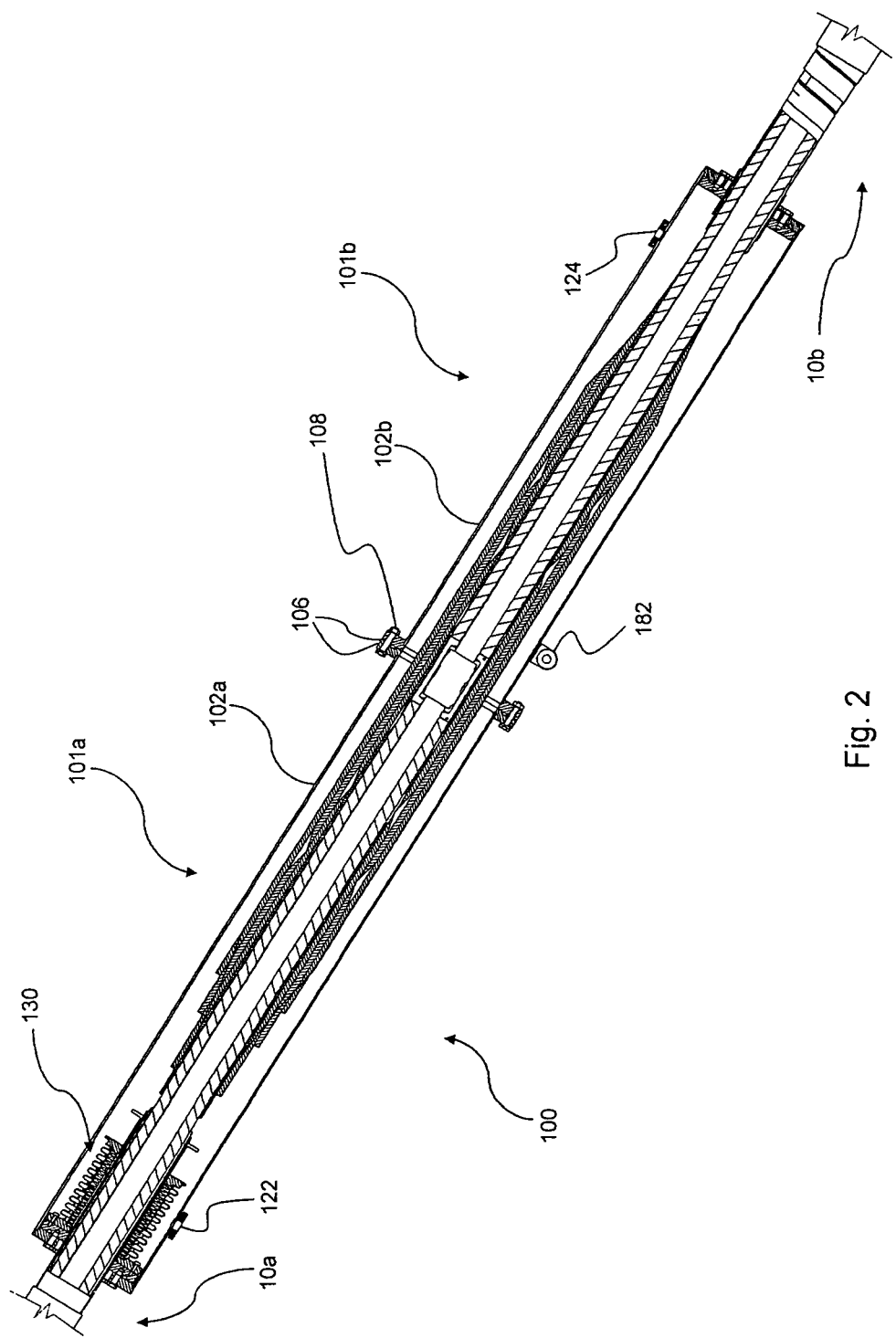
FIG. 2 shows an embodiment of a joint according to the invention.

As shown in the right side of the joint in FIG. 2, the longitudinally external edges of the stratified insulation are then "shaved" with a suitable cutting edge, so as to form a smooth outer surface having a sigmoid shape that joins the maximum outer diameter of the stratified insulation with the outer diameter of the cable insulation layer 16.

An external semiconducting layer 98 is then arranged about (and radially outside of) the stratified insulation, and about the nearby portions of exposed original cable insulation layer 16 until longitudinally reaching and being at some extent superimposed to the exposed outer semiconducting layers 18 of the cables. In the present joint, the electrical screening function of the outer semiconducting layer 18 is performed by the external semiconducting layer 98.

Metal casing 100, previously temporarily slid around both cable ends 10a, 10b, away from the jointing zone, is slid at the jointing zone and electrically and mechanically connected to the lead sheaths 20 of each of the cable ends 10a, 10b, thus reconstructing the electrical continuity of lead sheath 20 and grounding.

Casing 100 forms essentially a hollow, preferably cylindrical, shield, so as to form, once so mechanically connected to the lead sheaths 20, an enclosed space for protecting the stratified insulation and for containing the viscous compound for impregnating the stratified insulation and cable insulation layer 16.

Metal casing 100 is made of two portions 101a, 101b each having a tubular wall 102a, 102b having an inner diameter larger than the outer diameter of the stratified insulation. An annular flange 106 protrudes radially outwards from the tubular wall 102a, 102b of each portion 101a, 101b at the end of engagement with the other portion 101b, 101a.

Figure 5:
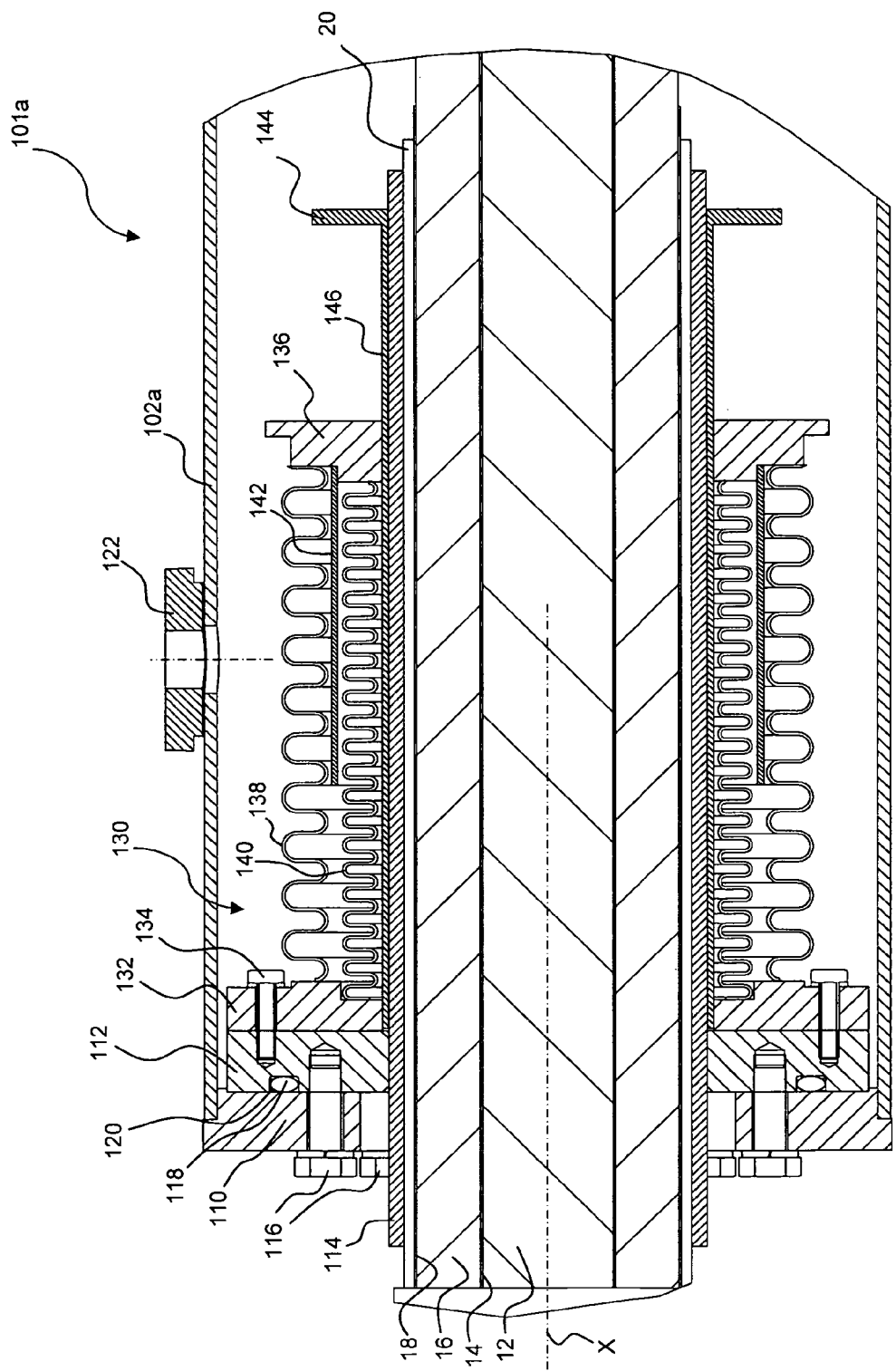

Reference is also made to FIG. 5, wherein an annular flange 110 radially protrudes inwards from the tubular wall 102a, 102b, and an annular flange 112 protrudes radially outwards from a tubular sleeve 114.

To mount the casing 100, the two tubular walls 102a, 102b are first moved away from each other. Each sleeve 114 is then welded to the underlying exposed lead sheath 20. At least one volume compensating device 130 better disclosed below was inserted in connection with one of the two opposite protruding flanges 112 before the sliding of the casing portions over the cable ends to be joined. The two tubular walls 102a, 102b are then slid towards each other, until the longitudinally inner flanges 106 contact each other and each of the longitudinally outer flanges 110 contact the flanges 112 protruding from the sleeves 114. Metal casing 100 further comprises a lug 182 for ground connection.

The radially outward protruding flanges 106 of the two casing portions 101a, 101b are electrically and mechanically connected, such as through bolt and nut connections 108. A sealing gasket (not shown) is preferably provided between the flanges 106.

The contacting flanges 110, 112 are similarly electrically and mechanically connected, such as through bolt and nut connections 116. A sealing gasket 118 is preferably provided between the flanges 110, 112, such as in an annular groove 120 of flange 112.

Casing 100 comprises two plugs 122, 124 preferably placed at diametrically opposed positions; plug 122 and plug 124 protrude outwards from cylindrical surface 102a, 102b. A viscous compound, preferably the same as that impregnating the original cable insulation layer 16 and the material constituting the stratified insulation, or at least a viscous compound having substantially the same viscosity, is filled under pressure into casing 100 from plug 122 until it spills from the plug 124. The above described sealing gaskets avoid leak of the viscous compound.

As briefly stated, casing 100 comprises a volume compensating device 130 to account for the volume changes of the viscous compound as the cable operating temperature changes.

In the embodiment shown in FIG. 5, volume compensating device 130 comprises a two-walled cylindrical bellows 130. More specifically, volume compensating device 130 comprises a first annular disk 132 which is fixed on the longitudinally inner face of flange 112 that protrudes from sleeve 114 on one end of casing 100 (the left end in FIG. 2) such as with screws 134, an axially freely moving second annular disk 136, and two concentric bellows shaped walls 138 and 140 longitudinally extending from the first to the second annular disks 132, 136. Walls 138, 140 are preferably made of stainless steel.

A cylindrical spacer 142 is preferably fixed to moving disk 136 and cantilever projects toward the other disk 132 between the two bellows shaped walls 138, 140, so as to limit the shortest length of bellows 130. An abutment annular wall 144 is also preferably provided to similarly limit the maximum length of bellows 130. In the embodiment shown, annular wall 144 projects radially outwards from a sleeve 146 fixed to the first annular disk 132 of volume compensating device 130, which sleeve 146 is slid about sleeve 114 of casing 100.

The stroke of bellows 130 as allowed by spacer 142 and abutment wall 144 is suitably sized so as to maintain the volume within casing 100 and thus the pressure of the viscous compound within the expected ranges. At the jointing step, the temperature of the viscous compound should be e.g. of 50-100° C. to lower its viscosity and to have a compound suitably fluid to be pumped into the space delimited by casing 100. The stand-by temperature, when cable 10 is not transporting any electrical current, corresponds to the environmental temperature, and can be e.g. as low as 5° C. to 10° C. or even lower. At such low temperature, the viscous compound undergoes a volume decrease and could leave some portion of the paper insulation not suitably impregnated, possibly causing subsequent impairment in the insulation performance. To ensure that the viscous compound impregnates all the paper of the joint even in the stand-by condition, its pressure should not be allowed to fall below e.g. 3 bar, while a maximum allowed pressure, at the moment of pouring into the metal casing 100, should be e.g. of 15 bar. During operation, when cable 10 is transporting electrical current, the temperature can reach up to 55° C. at the maximum in the case of impregnated paper insulation 16, of about 85° C. in the case of impregnated PPL insulation 16.

The cable layers radially outer with respect to the lead sheath 20, such as inner polymeric jacket 22, metallic tape reinforcement 24, and outer polymeric jacket 26, which have been removed at the joint, are not reconstructed at all according to the invention. A suitable heat shrinkable sheath (not shown) may be provided on each side of the casing 100 from the outer polymeric jacket 26 to a position very near the adjacent end of the casing 100, or even a single heat shrinkable sheath extending about the casing 100 itself from the outer polymeric jacket 26 of one cable end 10a to the outer polymeric jacket 26 of the other cable end 10b.

Table 1 below sets forth preferred ranges of sizes of an exemplary embodiment of cable joint according to the invention. These figures are provided solely as a guide and to allow the improvement with respect to prior art joints to be appreciated. Any adjustment to the figures below in view of the specific cable size and type, as well as in view of the environmental conditions, is within the common knowledge of a skilled person in the light of the above disclosure.

TABLE 1

| Cable and Joint Properties | Values |
| --- | --- |
| Maximum DC voltage | 500 kV |
| Conductor cross-section (copper) | 1400 mm$^2$ |
| Insulation outer diameter | 83.8 mm |
| Cable outer diameter | 120 mm |
| Cable weight per unit length | 45 kg/m |
| Length of ferrule | 100 mm |
| Length of metal insert | 145 mm |
| Thickness of intermediate semiconducting layer | 5 mm |
| Thickness of stratified insulation | 3 layers of 10 mm each + 1 partial layer of 5 mm |
| Metal casing diameter | 220 mm |
| Metal casing length | 2440 |
| Joint length | 2500 |
| Length of bellows | 198.6 mm |
| Average length of paper rolls | 1500 mm |
| Minimum distance between adjacent rolls | 5 mm |

Of course, a skilled in the art can make further modifications, replacements and omissions of the various components and of the various method steps described above in order to satisfy specific and contingent application requirements, in any case encompassed within the scope of protection as defined by the following claims. The following should only be taken as an example.

The dual walled bellows 130 may be replaced by another volume compensating device, e.g. comprising an external circuit, including a reservoir, for the viscous compound.

The above disclosed metal casing 100 may also be used, possibly with the volume compensating device 130, when the impregnated insulation layer of the cable is reconstructed according to the prior art.

The above disclosed technique for insulating the joint, which advantageously avoids the pencil-like removal of the original impregnated insulation layer and considerably shortens the length of the joint, may be advantageously used also when the lead alloy sheath 20 and the layers radially outer thereto are reconstructed in a conventional way, without using the metal casing 100.

The invention claimed is:

1. A method of jointing two high voltage impregnated cables, each comprising a conductive core, made of a conductor wrapped in an inner semiconducting layer, a cable insulation layer, impregnated with a first viscous compound, radially external to the conductive core, an outer semiconducting layer radially external to the cable insulation layer, and at least one protecting layer radially external to the outer semiconducting layer, the method comprising:
    exposing a length of the impregnated cable insulation layer of each cable end by removing the at least one protecting layer and the outer semiconducting layer;
    exposing a terminal length of the conductor of each cable end by cutting essentially perpendicularly to a longitudinal axis of each cable a portion of the impregnated cable insulation layer and by removing the inner semiconducting layer;
    mechanically and electrically connecting the conductors;
    filling at least in part a space left by the removed impregnated cable insulation layer with a conductive insert;
    providing an intermediate semiconducting layer to surround the conductive insert and abutting on portions of cable insulation layers adjacent to the conductive insert;
    applying a stratified insulation, impregnated with a second viscous compound, longitudinally overlapping the exposed length of the impregnated cable insulation layer of each cable end and covering the intermediate semiconducting layer;
    electrically screening the conductors; and
    tightly containing the first viscous compound, the second viscous compound, or the first and second viscous compounds.

2. The method according to claim 1, wherein the filling at least in part the space left by the removed impregnated cable insulation layer with a conductive insert comprises:
    arranging a metal insert having substantially a same outer diameter as an outer diameter of the impregnated cable insulation layer.

3. The method according to claim 1, wherein the applying the stratified insulation comprises:
    providing rolls of impregnated insulation at both sides of the intermediate semiconducting layer, the rolls having substantially a same outer diameter as the intermediate semiconducting layer so as to form an even cylindrical surface.

4. The method according to claim 3, wherein the applying the stratified insulation further comprises:
    arranging at least one further layer of impregnated insulation material over the rolls of impregnated insulation and the intermediate semiconducting layer.

5. The method according to claim 1, further comprising:
    shaving the stratified impregnated insulation at longitudinal edges to obtain an even surface with a sigmoid profile.

6. The method according to claim 1, wherein the electrically screening the conductors is carried out by wrapping the stratified insulation with a layer of semiconductive material.

7. The method according to claim 1, further comprising:
    providing a volume compensating device.

8. The method according to claim 1, wherein the first viscous compound is the same as the second viscous compound.

9. A joint for splicing two high voltage impregnated cables comprising respective conductive cores made of conductors wrapped in inner semiconducting layers, cable insulation layers, impregnated by a first viscous compound, radially external to the conductive cores, outer semiconducting layers surrounding the cable insulation layers, and protecting layers radially external to the outer semiconducting layers, the joint having a longitudinal axis and comprising:

- mechanically and electrically connected conductors;
- impregnated cable insulation layers having faces cut essentially perpendicular to the longitudinal axis of the joint and being shorter than the respective conductors;
- a conductive insert interposed between the faces of the impregnated cable insulation layers;
- an intermediate semiconducting layer surrounding the conductive insert and abutting on portions of the cable insulation layers adjacent to the conductive insert;
- a stratified insulation, impregnated with a second viscous compound, longitudinally overlapping the impregnated cable insulation layers and covering the intermediate semiconducting layer;
- an external semiconducting layer wrapping the impregnated stratified insulation and the impregnated cable insulation layers;
- a metal casing enclosing the external semiconducting layer and extending over the outer semiconducting layers; and
- the first viscous compound, the second viscous compound, or the first and second viscous compounds contained in the metal casing.

10. The joint according to claim 9, wherein the joint splices two high voltage direct current cables.

11. The joint according to claim 9, wherein the conductive insert comprises a metal insert.

12. The joint according to claim 9, wherein the intermediate semiconducting layer has edges with a tapering degree of at most 1:10.

13. The joint according to claim 9, wherein the intermediate semiconducting layer overlaps portions of the cable insulation layers to an extent covering an interface between such layers and the conductive insert.

14. The joint according to claim 9, wherein the impregnated stratified insulation comprises at least two rolls of wrapped sheet impregnated insulation material.

15. The joint according to claim 9, wherein the impregnated stratified insulation comprises at least three rolls of wrapped sheet impregnated insulation material.

16. The joint according to claim 15, wherein edges of a first roll of the at least three rolls of one layer of the impregnated stratified insulation are longitudinally offset with respect to edges of a second roll of the at least three rolls of a radially adjacent layer.

17. The joint according to claim 9, wherein windings of stretch paper are interposed in spaces between edges of longitudinally adjacent rolls.

18. The joint according to claim 9, further comprising:
a volume compensating device within the metal casing.

19. A power supply line comprising at least one joint according to claim 9.

20. The joint according to claim 9, wherein the first viscous compound is the same as the second viscous compound.

* * * * *